US011115274B2

(12) United States Patent
Ni et al.

(10) Patent No.: US 11,115,274 B2
(45) Date of Patent: Sep. 7, 2021

(54) UPGRADING OF A MOBILE NETWORK FUNCTION

(71) Applicant: Huawei Technologies Co., Ltd., Shenzhen (CN)

(72) Inventors: Shaoji Ni, Helsinki (FI); Francis Pak Kwan Tam, Kista (SE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 206 days.

(21) Appl. No.: 15/680,801

(22) Filed: Aug. 18, 2017

(65) Prior Publication Data

US 2017/0346682 A1 Nov. 30, 2017

Related U.S. Application Data

(63) Continuation of application No. PCT/EP2015/053354, filed on Feb. 18, 2015.

(51) Int. Cl.
*H04L 12/24* (2006.01)
*G06F 8/656* (2018.01)
*H04L 29/08* (2006.01)
*H04L 12/725* (2013.01)

(52) U.S. Cl.
CPC ............ *H04L 41/082* (2013.01); *G06F 8/656* (2018.02); *H04L 67/34* (2013.01); *H04L 45/306* (2013.01)

(58) Field of Classification Search
CPC ..... H04L 41/082; H04L 67/34; H04L 45/306; G06F 8/656; G06F 8/71
See application file for complete search history.

(56) References Cited

U.S. PATENT DOCUMENTS

| 6,101,327 | A | * | 8/2000 | Holte-Rost | ........ H04Q 3/54516 717/170 |
| 6,222,916 | B1 | * | 4/2001 | Cameron | ............. H04Q 3/0054 379/207.03 |
| 7,669,073 | B2 | | 2/2010 | Graham et al. | |
| 10,019,255 | B1 | * | 7/2018 | Greenfield | ................ G06F 8/65 |

(Continued)

FOREIGN PATENT DOCUMENTS

| CN | 102084705 A | 6/2011 |
| CN | 101399701 B | 1/2013 |

(Continued)

OTHER PUBLICATIONS

Foreign Communication From a Counterpart Application, PCT Application No. PCT/EP2015/053354, English Translation of International Search Report dated Jul. 16, 2015, 4 pages.

(Continued)

*Primary Examiner* — Tonia L Dollinger
*Assistant Examiner* — Jihad K Boustany
(74) *Attorney, Agent, or Firm* — Conley Rose, P.C.

(57) ABSTRACT

A traffic handling decision method, a network entity, a computer readable medium, and a traffic handling decision apparatus relate to upgrading a network service function within a mobile communication network. In this context the traffic handling decision apparatus distributes incoming request of the control plane to instances implementing the mobile network function either according to the current software version or an upgraded software version.

20 Claims, 12 Drawing Sheets

(56) References Cited

U.S. PATENT DOCUMENTS

| | | | |
|---|---|---|---|
| 2008/0295088 A1* | 11/2008 | Bhat | G06F 8/656 |
| | | | 717/170 |
| 2009/0089774 A1 | 4/2009 | Lynch et al. | |
| 2010/0330971 A1* | 12/2010 | Selitser | H04L 67/34 |
| | | | 455/418 |
| 2012/0063300 A1 | 3/2012 | Sahin et al. | |
| 2012/0072894 A1 | 3/2012 | Wang et al. | |
| 2014/0036665 A1 | 2/2014 | Chowdhury et al. | |
| 2014/0094206 A1 | 4/2014 | Persson et al. | |
| 2014/0204864 A1* | 7/2014 | M | G06Q 30/0202 |
| | | | 370/329 |
| 2014/0304698 A1 | 10/2014 | Chigurapati et al. | |
| 2015/0207662 A1* | 7/2015 | Basso | H04L 41/046 |
| | | | 709/223 |
| 2016/0142392 A1* | 5/2016 | Ahmed | H04L 63/205 |
| | | | 726/7 |

FOREIGN PATENT DOCUMENTS

| | | | | |
|---|---|---|---|---|
| CN | 103202064 A | 7/2013 | | |
| CN | 103392376 A | 11/2013 | | |
| WO | WO-9401819 A1 * | 1/1994 | | G06F 11/1433 |
| WO | 2014122637 A1 | 8/2014 | | |

OTHER PUBLICATIONS

Foreign Communication From a Counterpart Application, PCT Application No. PCT/EP2015/053354, English Translation of Written Opinion dated Jul. 16, 2015, 6 pages.
Foreign Communication From a Counterpart Application, Chinese Application No. 201580076298.7, Chinese Office Action dated May 17, 2019, 9 pages.

* cited by examiner

UPGRADING OF A MOBILE NETWORK FUNCTION

CROSS-REFERENCE TO RELATED APPLICATIONS

This application is a continuation of International Patent Application No. PCT/EP2015/053354 filed on Feb. 18, 2015, which is hereby incorporated by reference in its entirety.

TECHNICAL FIELD

The disclosure relates to upgrading a network service function within a mobile communication network. In this context the disclosure relates to a traffic handling decision module that distributes incoming request of the control plane to instances implementing the mobile network function either according to the current software version or an upgraded software version. Furthermore, the disclosure relates to a method, network entity and computer readable medium for upgrading a mobile network function.

BACKGROUND

Long Term Evolution (LTE)

The $3^{rd}$ Generation Partnership Program (3GPP) standardized a new mobile communication system called LTE. LTE has been designed to meet carrier needs for high speed data and media transport as well as high capacity voice support. The work item specification on LTE called Evolved Universal Mobile Telecommunications Service (UMTS) Terrestrial Radio Access (UTRA) and UTRA Network (UTRAN) has been released as LTE Release 8 (LTE Rel. 8).

The LTE system provides packet-based radio access and radio access networks with fully Internet Protocol (IP)-based functionality at low latency and low costs. LTE specifies multiple transmission bandwidths to achieve flexible system deployment. In the downlink, Orthogonal Frequency Division Multiplexing (OFDM) based radio access is used, while single-carrier frequency division multiple access (SC-FDMA) based radio access was adopted in the uplink. Many key packet radio access techniques are employed including multiple-input multiple-output (MIMO) channel transmission techniques, and a highly efficient control signaling structure is achieved in LTE Rel. 8/9.

The frequency spectrum for International Mobile Telecommunications-Advanced (IMT-Advanced) (i.e., fourth generation (4G)) was decided at the World Radio communication Conference 2007 (WRC-07). IMT-Advanced, which includes LTE-Advanced (also known as LTE-A or LTE Rel. 10), provides a global platform on which to build next generations of interactive mobile services that will provide faster data access, enhanced roaming capabilities, unified messaging and broadband multimedia. The specification of LTE-A introduced enhancements such as carrier aggregation, multi-antenna enhancements and relays (Relay Nodes). The 3GPP specification of LTE-A was finalized in March 2011 and supports peak data rates up to 3.5 gigabits per second (Gbit/s) in the downlink and 1.5 Gbit/s in the uplink. Further, LTE-A introduces support of Self Organizing Networks (SON), Multimedia Broadcast/Multicast Service (MBMS) and Heterogenous Networks (HetNets). Other LTE-A enhancements to LTE include architecture improvements for Home (e)NodeBs (i.e. femtocells), local IP traffic offloading, optimizations for machine-to-machine communications (M2C or MTC), Single Radio Voice Call Continuity (SRVCC) enhancements, evolved MBMS (eMBMS) enhancements, etc.

In December 2012, further improvements to LTE-A have been standardized in the 3GPP in LTE-A Rel. 11. With this at present latest release of LTE-A, features like Coordinated Multi-Point transmission/reception (CoMP), Inter-Cell Interference Coordination (ICIC) enhancements, Network Improvements for Machine-Type Communication (NIMTC), etc.

LTE architecture

FIG. 1 exemplarily shows the architecture of LTE, which equally applies to LTE-A as well. The evolved UTRAN (E-UTRAN) comprises the evolved NodeB (eNodeB) (which can be also referred to as a base station). The eNodeB provides the E-UTRA user plane (for example Packet Data Control Protocol (PDCP)/Radio Link Control (RLC)/Medium Access Control (MAC)/Physical (PHY)) and control plane (for example Radio Resource Control (RRC)) protocol terminations towards the user equipment (UE). The eNodeB (also known as eNB) hosts the PHY, MAC, RLC, and PDCP layers that include the functionality of user-plane header-compression and encryption. The eNodeB is also responsible for handling RRC functionality corresponding to the control plane and also implements several additional management functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the Evolved Packet Core (EPC), and to the Mobility Management Entity (MME) by means of the S1-MME and to the Serving Gateway (S-GW) by means of the S1-U. The S1-U interface is using the General Packet Radio Service (GPRS) Tunneling Protocol—User Plane (GTP-U), while the S1-MME interface implements Stream Control Transmission Protocol (SCTP) or S1—Application Protocol (S1-AP). The S1 interface supports a many-to-many relation between MMEs/S-GWs and eNodeBs.

The S-GW routes and forwards user data packets, while also acting as the mobility anchor for the user plane during inter-eNodeB handovers and as the anchor for mobility between LTE and other 3GPP technologies. The S-GW terminates the S4 and S12 interface and relays the traffic between second generation (2G)/third generation (3G) systems (via Serving GPRS Support Node (SGSN)) and the packet data network (PDN) gateway (GW) (P-GW). For idle state UEs, the S-GW terminates the downlink data path and triggers paging when downlink data arrives for the UE. It manages and stores UE contexts, e.g. parameters of the IP bearer service, network internal routing information. It also performs replication of the user traffic in case of lawful interception.

The MME is the key control-node for the LTE access-network. It is responsible for idle mode UE tracking and paging procedure including retransmissions. It is involved in the bearer activation/deactivation process and is also responsible for choosing the S-GW for a UE at the initial attach and at time of intra-LTE handover involving Core Network (CN) node relocation. It is responsible for authenticating the user (by interacting with the home subscriber server (HSS)). The Non-Access Stratum (NAS) signaling terminates at the MME and it is also responsible for generation and allocation of temporary identities to UEs. It checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN.

The MME also terminates the S6a interface towards the HSS for roaming UEs. Further, the MME is also connected to the closed subscriber group (CSG) Subscriber Server (CSS) via the S7a interface and the Equipment Identity Register (EIR) via the S13 interface.

Software Updates

The structure of a mobile communication, such as LTE or LTE-A, is very complex and is broken down into more manageable logical entities known as network entities. A network entity can either be a facility or equipment that carries out some mobile network functions. Example of mobile network functions are SGSN, MME, Mobile Switching Center (MSC), Mobile Switching Server (MSS), S-GW, Gateway GPRS Support Node (GGSN) and P-GW.

FIG. 2 shows an exemplary and general implementation of a mobile network function. An instance of a mobile network function typically consists of an application that implements the specific mobile network function, platform software for commonly used services (also sometimes called middleware) and an operating system running on some computer hardware. For purposes such as load sharing or balancing, high availability, etc. multiple mobile network function instances may be provided that operate in parallel, a mobile network function instance may cooperate with other equivalent instances at each implementation layer, i.e. application, platform, and operating system. Depending on the usage and capacity requirements of traffic input into a particular network, a variable number of mobile network function instances can be deployed in order to fulfil these requirements.

One of the problems in this kind of implementation is that the software for application, platform and operating system may evolve over time and their upgrade is required to fix bugs and/or add new features. However, mobile networks have a very stringent requirement on its availability of services to the end users. Therefore, it is expected that when mobile network functions need to be upgraded, the mobile network should still be operating and providing communications services to the end users with very little or no disruption.

Another problem associated with upgrade is that the new software version of the software may not be compatible with the old software version. This means that either one of the new or old software versions can be running at the same time, but not both. This is because incompatible versions, by definition, behave differently. Whether they exhibit a different interface or the data produced are in a different format, the resulting effect is that instances of a mobile network function of these incompatible versions cannot cooperate as intended. In addition, traffic entering a mobile network function are typically connection-oriented services and stateful. These state information (e.g. context information) must be preserved during an upgrade in order to avoid disrupting existing connections, which cause service disruptions to the end users.

There have been attempts to resolve the problems of upgrading software with minimum or no service disruption previously, even when the old and new software versions of the software are incompatible. U.S. Pat. No. 7,669,073 B2 describes a method in which a system to be upgraded can be split into a number of independently operational subsystems, with one being the active system which continues to provide normal services to the users and the other subsystems being upgraded. Finally, the isolated subsystems can be merged and normal operation will resume.

FIGS. 3A, 3B, 3C, 3D, and 3E illustrate an example how such a split mode upgrade can be used in the context of upgrading a mobile network function that follows a general instance structure with application, platform and operating system. In a first step, as shown in FIG. 3A the mobile network function instances are split into two halves. In FIG. 3A, the instances on the right hand side stop serving user traffic, and as a result the mobile network function delivers the service with roughly half the capacity. Note that there are of course alternatives on how a mobile network function instances can be split. For example in another implementation that contains redundant instances, by dividing along the line of active and redundant instances during an upgrade, the full intended capacity is maintained although there is no protection by redundancy against any failure in this case.

In a next step, as shown in FIG. 3B, the previously stopped mobile network function instances on the right hand side are being upgraded, as indicate by the dashed filling of the blocks. The upgraded mobile network function instances are not serving traffic yet, and as a result the mobile network function still delivers the service at roughly half of the intended capacity, or there is no protection by redundancy against failure in case of the before mentioned other implementation.

In the next step, as shown in FIG. 3C, data generated by the mobile network function instances implementing the old software version software are converted (in format) to match the new software version software (if the two are incompatible). The traffic is now switched from the old software version mobile network function instances to the mobile network function instances implementing the new, upgraded version software. As a result the newly upgraded mobile network function instances deliver the service again at roughly half the intended capacity because the old software version on the left hand side is not serving user traffic any more.

In the next step, as shown in FIG. 3D, the mobile network function instances on the left hand side are upgraded. The newly upgraded mobile network function instances on the left hand side are merged with the previously upgraded mobile network function instances on the right hand side, as shown in FIG. 3E and the traffic is now again severed by all upgraded mobile network function instances at the intended full capacity, or in the before-mentioned other implementation with the desired protection by redundancy.

If the formats of data generated by the old and new software versions are incompatible, data conversion from the old to the new software version must be performed as explained above. Such kind of data conversion is for example described in US 2009/0089774 A1. Such data conversion tends to be tedious and requires an exact description of the differences between the two software versions. The conversion process is also known to be error-prone. For example, the high volume of dynamic data needed to be converted in a typical mobile network is likely to bring difficulty in the data conversion, resulting in some unintended service disruptions.

In addition, the serving capacity during the upgrade between the steps illustrated in FIGS. 3A to 3C has been reduced to roughly half, thus limiting the flexibility of scheduling an upgrade to be carried out only at off-peak periods to avoid overloading the system. Note that under an instance that contains redundant instances, by dividing along the line of active and redundant instances during an upgrade, the full intended capacity is maintained although there is no protection by redundancy against any failure in this case.

Further, if the new software version of software does not work properly after the switching action in the step explained in connection with FIG. 3B above, the failure recovery is to restart the old software version of the mobile network function, which will in turn cause service outage during the restart period.

SUMMARY

One object of the disclosure is to suggest a mechanism allowing mitigation of one or more of the above noted potential problems with upgrading a mobile network function. Another object of the disclosure is to suggest a mechanism that allows an in-service upgrade of a mobile network function. A further object of the disclosure is to suggest a mechanism that allows an in-service upgrade of a mobile network function which does not disrupt services and/or which does not require data conversion. Further objects are to avoid a reduction of the service capacity or protection by redundancy against failure while the system is being upgraded, and enabling a fast recovery, if the software upgrade fails.

A first aspect of the disclosure relates to a migration from using instances providing a mobile network function implemented with an old (current) software version towards instances providing the mobile network function implemented with a new (upgraded) software version. This may be achieved by adding to the existing one or more instances implementing the mobile network function according to the current software, another one or more instances implementing the mobile network function according to the new upgraded software. The number of instances implementing the mobile network function according to the current software may be reduced, for example, in one or more steps until there is no such instance left. Simultaneously and/or optionally, one or more instances implementing the mobile network function according to the new upgraded software may be added, for example, in one or more steps in order to complete the software migration. In this migration process, the control traffic is handled by one or more instances providing the mobile network function implemented with an old (current) software version. These one or more instances distribute requests to the instances implementing the mobile network function according to the current and upgraded software. The distribution may be controlled by different criteria or by one or more profiles that could be for example configured by a management entity.

A second aspect of the disclosure relates to a traffic handling decision module that distributes incoming request of the control plane to instances implementing the mobile network function either according to the current software version or an upgraded software version. By controlling the control plane traffic by a traffic handling decision module implemented in one or more instances of implementing the mobile network function according to the current software version, the need for data conversions may be avoided since bearer services or sessions running upon start of the upgrade may still be serviced by instances implemented using the old (current) version software.

The first and second aspect (and their different embodiments and implementations discussed herein) may be combined with one another.

In line with the second aspect, a first embodiment thereof relates a traffic handling decision module for use in a network entity of a mobile communication system. The traffic handling decision module may be provided within an instance implementing, on the network entity, a mobile network function according to a current software version. The traffic handling decision module may comprise a receiving sub-module configured to receive control plane traffic, the control plane traffic comprising requests to the mobile network function, a decision sub-module configured to decide, for each received request, whether a respective request is to be processed by an instance implementing the mobile network function according to the current software version or an instance implementing the mobile network function according to an upgraded software version, a routing sub-module configured to route each request to either an instance implementing the mobile network function according to the current software version or an instance implementing the mobile network function according to the upgraded software version, depending on the decision of the decision sub-module.

According to a second embodiment of the second aspect, the decision sub-module may perform its decision based on one or more policies set by a management entity of the mobile communication network. In a first example implementation of such embodiment, the one or more policies include a policy according to which requests of the control plane traffic related to a bearer or session established prior to activation of the policy are to be routed to an instance implementing the mobile network function according to the current software version.

In a second example implementation of the embodiment of the second aspect, in addition to the feature of the first implementation above or alternatively thereto, the one or more policies include a policy according to which requests of the control plane traffic related to a new bearer or session to be established after activation of the policy are to be routed to an instance implementing the mobile network function according to the upgraded software version.

In a third example implementation of the second embodiment of the second aspect, in addition to the feature of the first implementation above or alternatively thereto, the one or more policies include a policy according to which requests of the control plane traffic related to a new bearer or session to be established after activation of the policy are to be routed to an instance implementing the mobile network function according to the upgraded software version, in case a predetermined percentage or number of established bearers or sessions is not yet routed to one or more instances implemented by an upgraded software version implementing the mobile network function, and are to be routed to an instance implementing the mobile network function according to the current software version otherwise.

According to a third embodiment, and in any of the before mentioned embodiments of the second aspect, the one or more policies are updated by the management entity of the mobile communication network.

According to a fourth embodiment, and in any of the before mentioned embodiments of the second aspect, the mobile network function comprises at least one of a control plane function, a user plane function, or a management function implemented by the network entity of the mobile communication system.

According to a fifth embodiment, and in any of the before mentioned embodiments of the second aspect, the mobile network function comprises functionality implemented by the network entity in the mobile communication system.

According to a sixth embodiment, and in any of the before mentioned embodiments of the second aspect, the traffic handling decision module is implemented in a software of a stateful protocol of a network layer or a higher layer within the Open Systems Interconnection (OSI) protocol stack.

In line with the first aspect of the disclosure, an seventh embodiment relates to a method for upgrading a current software version implementing a mobile network function. Such update may be performed using this method without disrupting on-going bearer services, connections or sessions. The method comprises providing the mobile network function at a network entity by executing one or more instances implementing the mobile network function according to the current software version, adding at least one instance implementing the mobile network function at the network entity according to an upgraded software version, receiving, at one or more of the instances implementing the mobile network function according to the current software version, control plane traffic comprising requests to the mobile network function, routing some (e.g. a subset) of the requests within the received control plane traffic from the respective instance of a current software version to an instance implementing the mobile network function according to the upgraded software version, and processing, at each of the instances of implemented by the upgraded software version and at each of the instances of the current software version, the requests received at the respective instances.

According to an eighth embodiment, and in any of the before mentioned embodiments of the first aspect, the method further comprises deciding based on one or more policies, whether to route a respective request either to an instance implementing the mobile network function according to the current software version or to an instance implementing the mobile network function according to the upgraded software version.

According to a first example implementation of the eighth embodiment, the one or more policies include a policy according to which requests of the control plane traffic related to a bearer or session established prior to activation of the policy are to be routed to an instance implementing the mobile network function according to the current software version.

According to a second example implementation of the eighth embodiment, and optionally further to the features of the first example implementation the of the eighth embodiment, the one or more policies include a policy according to which requests of the control plane traffic related to a new bearer or session to be established after activation of the policy are to be routed to an instance implementing the mobile network function according to the upgraded software version.

According to a third example implementation of the eighth embodiment, and optionally further to the features of the first example implementation the of the eighth embodiment, the one or more policies include a policy according to which requests of the control plane traffic related to a new bearer or session to be established after activation of the policy are to be routed to an instance implementing the mobile network function according to the upgraded software version, in case a predetermined percentage or number of established bearers or sessions is not yet routed to one or more instances implementing the mobile network function according to the upgraded software version, and are to be routed to an instance implementing the mobile network function according to the current software version otherwise.

According to a ninth embodiment, and in any of the foregoing embodiments of the first aspect, the method further comprises establishing, by an instance implementing the mobile network function according to the current software version, a bearer for a session in response to the processing of the request within said instance implementing the mobile network function according to the current software version, and receiving, via the established bearer, user plane traffic of said session at an instance implementing the mobile network function according to the current software version.

According to an eleventh embodiment, and in any of the foregoing embodiments of the first aspect, the method further comprises establishing, by an instance implementing the mobile network function according to the upgraded software version, a bearer for a session in response to the processing of the request within said instance implementing the mobile network function according to the upgraded software version, and receiving, via the established bearer, user plane traffic of said session at an instance implementing the mobile network function according to the upgraded software version.

According to a twelfth embodiment, and in any of the foregoing embodiments of the first aspect, the method further comprises removing one or more of the instances implementing the mobile network function according to the current software version.

According to a first example implementation of the twelfth embodiment, the instances are removed in response to the deletion or time-out of context information maintained by the mobile network function implemented according to the current software version.

According to a second example implementation of the twelfth embodiment, and optionally further to the features of the first example implementation the of the twelfth embodiment, an instance is removed in response to moving the context information maintained with said instance to another instance implementing the mobile network function according to the current software version.

According to a third example implementation of the twelfth embodiment, and optionally further to the features of the first or second example implementation the of the twelfth embodiment, further comprising adding one or more further instances implementing the mobile network function at the network entity according to an upgraded software version.

According to a thirteen embodiment, and in any of the foregoing embodiments of the first aspect, the method further comprises in response to removing the last instance implementing the mobile network function according to the current software version, receiving the control plane traffic at the one or more instances implementing the mobile network function according to the upgraded software version and processing all requests received within the one or more of the instances implementing the mobile network function according to the upgraded software version.

According to a fourteenth embodiment, and in any of the foregoing embodiments of the first aspect, the control traffic is received only at one or more instances implementing the mobile network function according to the current software version.

According to a fifteenth embodiment, and in any of the foregoing embodiments of the first aspect, the method further comprises implementing a traffic handling decision module according to an embodiment of the second aspect within one, some or all instances implementing the mobile network function according to the current software version.

According to a sixteenth embodiment, and in any of the foregoing embodiments of the first aspect, the method further comprises implementing a traffic handling decision module according to an embodiment of the second aspect within one, some or all instances implementing the mobile network function according to the upgraded software version.

According to a seventeenth embodiment, and in any of the foregoing embodiments of the first aspect, the instances are implemented within one or more virtual servers. Further, the one or more virtual server may optionally be implemented on a dedicated hardware.

Another eighteenth embodiment of the first aspect provides a network entity capable of upgrading a current software version implementing mobile network function. The network entity may perform thus upgrade without disrupting on-going bearer services or sessions. The network entity comprises one or more processors configured to execute one or more instances implementing the mobile network function according to the current software version. The one or more processor units may also execute at least one instance implementing the mobile network function at the network entity according to an upgraded software version. Further there may be an interface configured to receive, at one or more of the instances implementing the mobile network function according to the current software version, control plane traffic comprising requests to the mobile network function. The one or more processor units may also route some (e.g. a subset) of the requests within the received control plane traffic from the respective instance by a current software version to an instance implemented by an upgraded software version, and to process, at each of the instances of implemented by an upgraded software version and at each of the instances of a current software version, the requests received at the respective instances.

The network entity according to a nineteenth embodiment a network entity can perform the steps of the method according to one of the various embodiments of the first aspect described herein. For example, the individual actions or steps of the various embodiments of the first aspect and second aspect described herein can be executed by one or more processors of a network entity.

Another twentieth embodiment of the first aspect provides a computer-readable medium storing instructions that, when executed by one or more processors of a network entity, cause the network entity to upgrade a current software version implementing a mobile network function without disrupting on-going bearer services or sessions, by providing the mobile network function at a network entity by executing one or more instances implementing the mobile network function according to the current software version, adding at least one instance implementing the mobile network function at the network entity according to an upgraded software version, receiving, at one or more of the instances implementing the mobile network function according to the current software version, control plane traffic comprising requests to the mobile network function, routing some of the requests within the received control plane traffic from the respective instance of a current software version to an instance implementing the mobile network function according to the upgraded software version, and processing, at each of the instances of implemented by the upgraded software version and at each of the instances of the current software version, the requests received at the respective instances.

The computer-readable medium according to a twenty-first embodiment stores instructions that, when executed by one or more processors of a network entity, cause the network entity to perform the steps of the method according to one of the various embodiments of the first aspect described herein.

BRIEF DESCRIPTION OF DRAWINGS

In the following embodiments of the disclosure are described in more detail in reference to the attached drawings. Similar or corresponding details in the drawings are marked with the same reference numerals.

DETAILED DESCRIPTION OF EMBODIMENTS

The following paragraphs will describe various embodiments of the different aspects. As noted above, a first aspect of the disclosure relates to a migration from using instances providing a mobile network function implemented with an old (current) software version towards instances providing the mobile network function implemented with a new (upgraded) software version. One of the main features of this first aspect is that both, the old and new software versions of a software implementing the mobile network function run at the same time during an upgrade, which may allow eliminating problems that can result from incompatibility of the two software versions. Having two different versions of the software running on a network entity may be achieved by adding to the existing one or more instances implementing the mobile network function according to the current, i.e. old, software, another one or more instances implementing the mobile network function according to the new, i.e. upgraded, software. The number of instances implementing the mobile network function according to the current software may be reduced, for example, in one or more steps until there is no such instance left. Simultaneously and/or optionally, one or more instances implementing the mobile network function according to the new upgraded software may be added, for example, in one or more steps in order to complete the software migration. In this migration process, one or more of the instances handles the control traffic providing the mobile network function implemented with an old (current) software version. These one or more instances distribute requests to the instances implementing the mobile network function according to the current and upgraded software. The distribution may be controlled by different criteria or by one or more profiles that could be for example configured by a management entity.

Upgrading a mobile network function according to one of the various embodiments described herein below may be implemented on a network entity such as for example, but not limited to, a base station (Node B), MME, P-GW, S-GW, SGSN, GGSN, Policy and Charging Rules Function (PCRF), etc. Of course the disclosure is not limited to the upgrade of network entities in a 3GPP-based mobile communication system.

Figure 4:
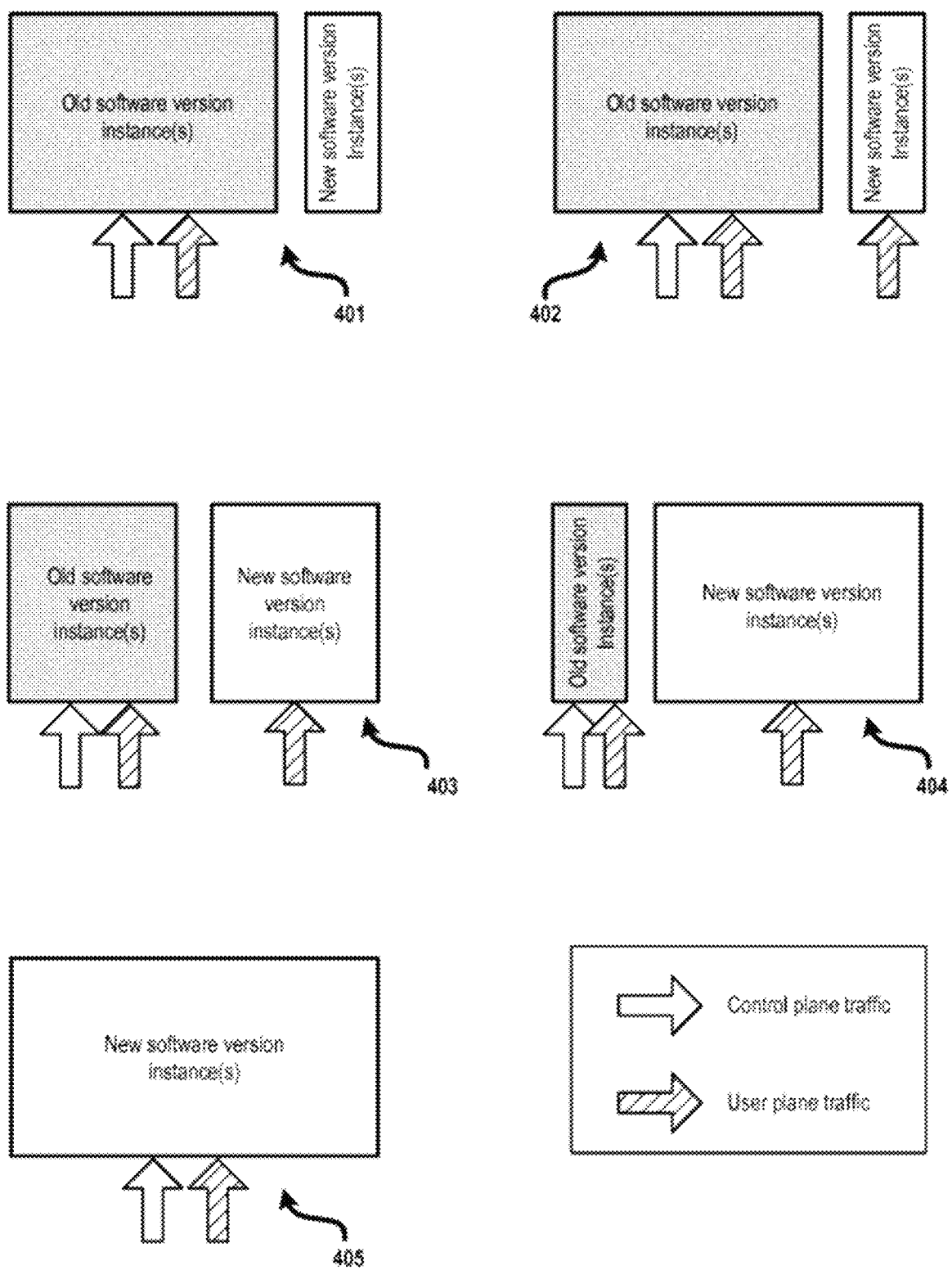
FIG. 4 shows an exemplary upgrade procedure for updating a current software version of a mobile network function to a new software version according to an embodiment of the disclosure.

FIG. 4 illustrates an exemplary upgrade procedure for updating a current software version of a mobile network function to a new software version according to an embodiment of the disclosure. In this procedure, in a first step 401, one or more instances of the current software version implementing the mobile network function are still executed. While these one or more instances of the old software version serve all the (control plane and user plane) traffic, the new software version with limited capacity is started/added, but it is not serving any live traffic yet. In a second step 402, new control traffic that comprises new service requests is routed to the established one or more instances of the new software version, while existing traffic is still supported by the old software version. In a third step 403, the serving capacity of the new software version is increased, e.g. by (successively) adding additional instances implementing the mobile network function based on the new software version, while the serving capacity of the old software version is decreased, e.g. by (successively) removing instances implementing the mobile network function based on the old software version. As indicated at a fourth step 404, the capacity of the serving capacity of the old software version may be successively decreased, until, in a fifth step 405, there is no or very little traffic left that is served by the old software version instance(s). In this fifth step 405, all the traffic entering the network entity may be directed to the instance(s) implementing the mobile network function according to the new software version.

Note that when moving from the third step to the fourth step, this may involve migrating some number of users, currently served by old software version instances internally in the old software version instances. This is however not mandatory—it is also possible to remove the last instance according to the old software version upon this instance no longer serving any user. The (successive) reduction of instances/capacity running the old software version may also involve the relocating service of some users from a first instance running the old software version to another second instance running the old software version such that the first instance can be removed.

A software version may be made of the full stack consisting of the application, platform and operating system, but this is not mandatory. A software version may also implement one or a subset of a module group comprising the application, platform of operation system. It should also be noted that in case the control traffic comprising a new service request is routed to an instance implemented by the new software version, the processing of the service request by the instance implemented by the new software version may involve the creation of a user plane. The user plane traffic is then also served by this instance implemented by the new software version.

The advantages of the above migration process for upgrading a software implementing a mobile network function may include the following.

Ongoing services/sessions/bearers are not disrupted. This is because it is possible that services/sessions/bearers already established upon starting the upgrade process can still be served by an instance implemented according to the old software version, and only new service requests will be handled by an instance that is implemented by the new software version.

Software upgrade could be done at any time during the day because the intended full capacity is still served even during the upgrade and/or protection by redundancy against failure is still provided.

Minimal additional resources are needed for the upgrade due to the incremental increase and decrease of resource usage on the new and old software versions.

Testing of the new software version can be carried out with real traffic, while the old software version is still serving traffic existing at the time of starting the upgrade (and optionally a part of the new services). Full service capacity can therefore always be offered by the old software version instance(s), even during initial testing.

The migration process allows for a fast recovery in case of errors, as the old software version is still running in one or more instances and will resume serving the full capacity as soon as the new software version is disconnected.

The coexistence of old and new software versions significantly reduces the problem of handling incompatibility between versions because real-time data synchronization between old and new software versions is not required.

The concept of scaled upgrade by allocating a limited amount of traffic to the new software version at each stage is supported. If the new software version proves to be working, more traffic can be routed to the new software version gradually until the new software version handles all the traffic. If there is an error in the new software version, the impact is limited as intended.

The proposed migration scheme allows for uniform upgrade of most business logic subsystems in a mobile network.

As indicated above, the migration from an old software version to a new software version according to the above procedure outlined in connection with FIG. 4, the following two procedures may be involved. Firstly, the a passive or active migration of user served by an instance implemented by the old software version to an instance implemented by the new software version (or vice versa) may be foreseen, e.g. in order to gradual increase and decrease serving capacity of instance(s) implemented according to the new and old software versions. For example, and without losing generality, mobile network standards such as those provided by 3GPP typically specify that resources associated with a user are released when they are in the state of "idle" or "not active," enabling the migration of users from one network function instance to another without service disruption. For example, MME and SGSN could be implemented using the standard detach/attach procedures and the graceful deletion of packet data protocol (PDP) contexts. For GGSN, P-GW and S-GW, they could be implemented by the standard graceful deletion of PDP contexts.

Hence, for a passive migration, the instances of the old software version may continue to serve those services existing upon starting the upgrade procedure and may be removed, once all services have terminated (e.g. all contexts associated with those services of the users are removed). This may also involve moving some of the ongoing services (e.g. related contexts) from one instance implemented by the old software version to another one in order to be able to remove some instance implemented by the old software version. In an active migration, some users might be actively moved during an ongoing service from their (initially serving) instance implemented by the old software version to another instance implemented by the old software version.

Secondly, and in line with the second aspect of the disclosure, the distinction between old and new traffic (or more precisely, between existing services and new services) and the according distribution of the incoming traffic. According to this second aspect of the disclosure a traffic handling decision module is suggested that is handling the distribution of incoming service request of the control plane to instances implementing the mobile network function either according to the current software version or an upgraded software version. By controlling the control plane traffic by a traffic handling decision module, the need for data conversions may be avoided since bearer services or sessions running upon start of the upgrade may still be serviced by instances implemented using the old (current) version software.

In the context of running the old and new software versions at the same time, maintaining connection-oriented services without disruption during an upgrade may inter alia require that the traffic handling decision module routes control plane traffic of already established services (e.g. their corresponding sessions and/or bearers) to the old software version in order to guarantee that there is no service interruption. Further, the traffic handling decision module may also route new service requests (e.g. attach, PDP context creation, session creation requests, etc.) and their subsequent signaling traffic to the new software version. The corresponding user traffic related state data (e.g. PDP context of user plane) will be created in the new software version by the control plane and the user traffic will be supported in the new software version. Note that the user plane traffic is established via the control plane and is routed to an old or new software version instance, e.g. depending on which instance created the user plane.

As a consequence, data from old and new traffic are generated separately on the old and new software versions respectively. This may allow eliminating the need to perform conversion of dynamic data generated by the old to the new software version during upgrade. Full capacity, or more than full capacity can be served during the upgrade by combining the capacity of the mobile network function instances implemented by old and new software versions. If the new software version does not work properly, recovery is quick as the old software version is still running and serving traffic.

Figure 1:
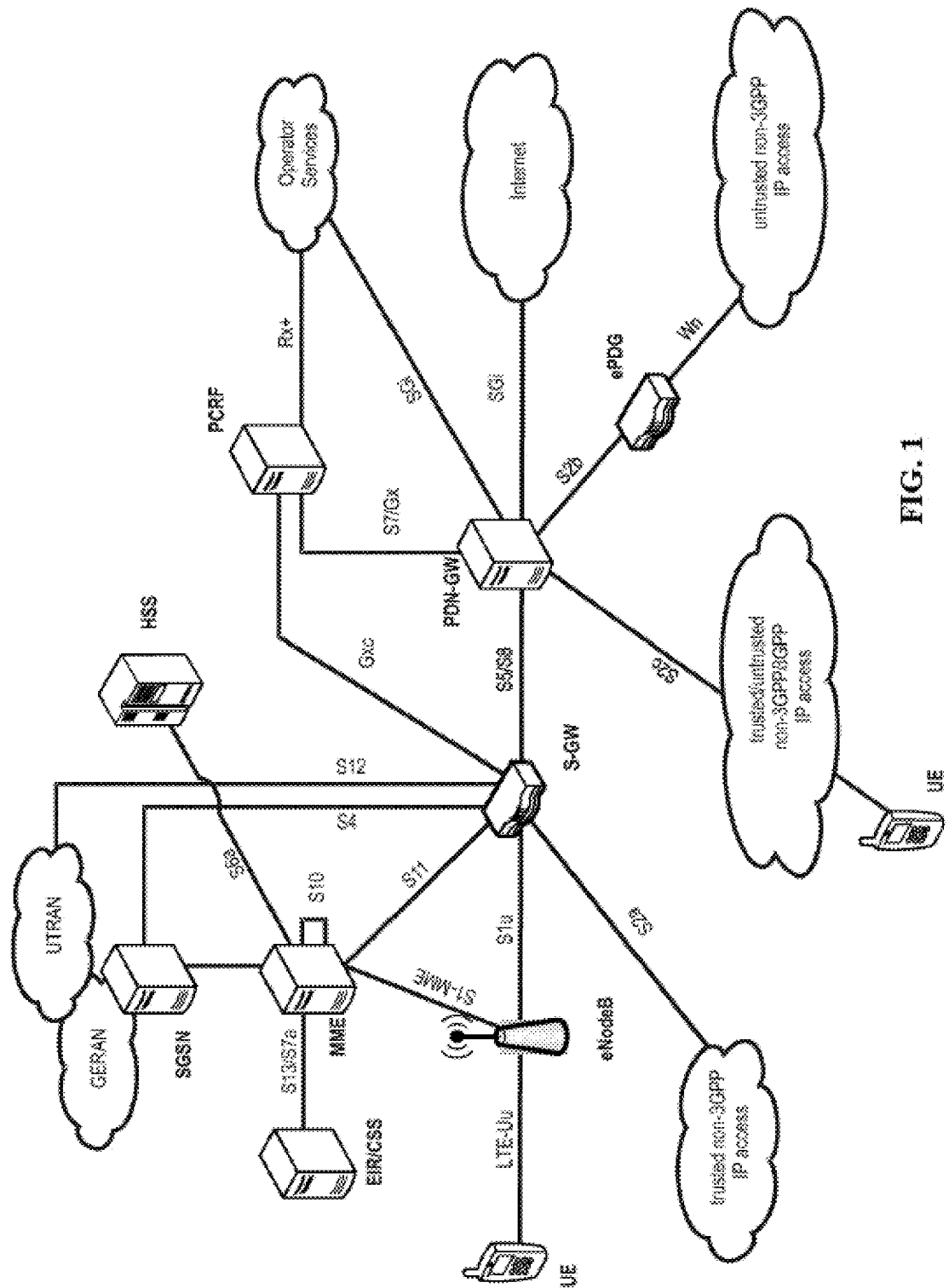
FIG. 1 shows the architecture of an LTE/LTE-A system.
Figure 2:
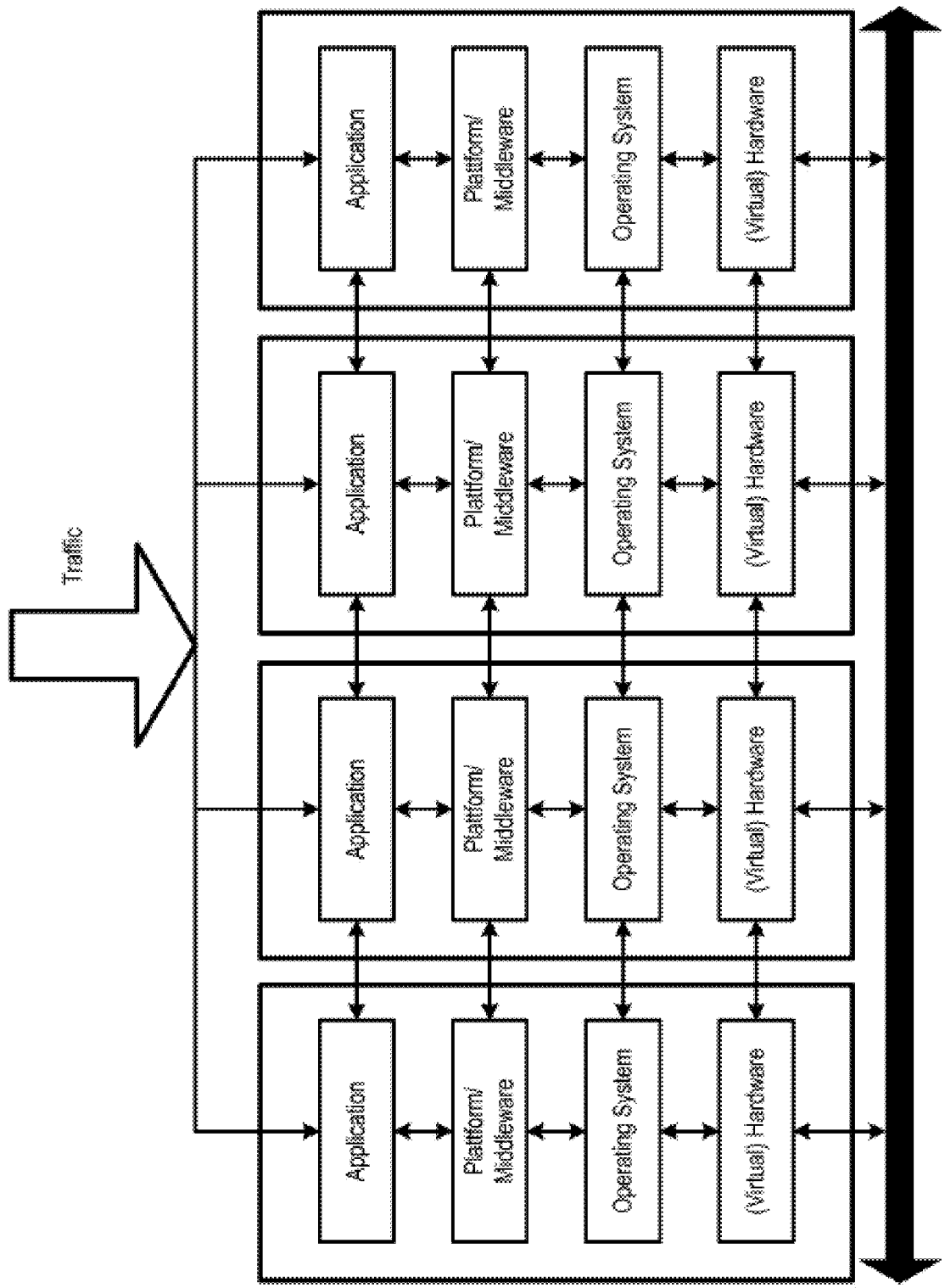
FIG. 2 shows an exemplary and general implementation of a mobile network function.
Figure 3A:
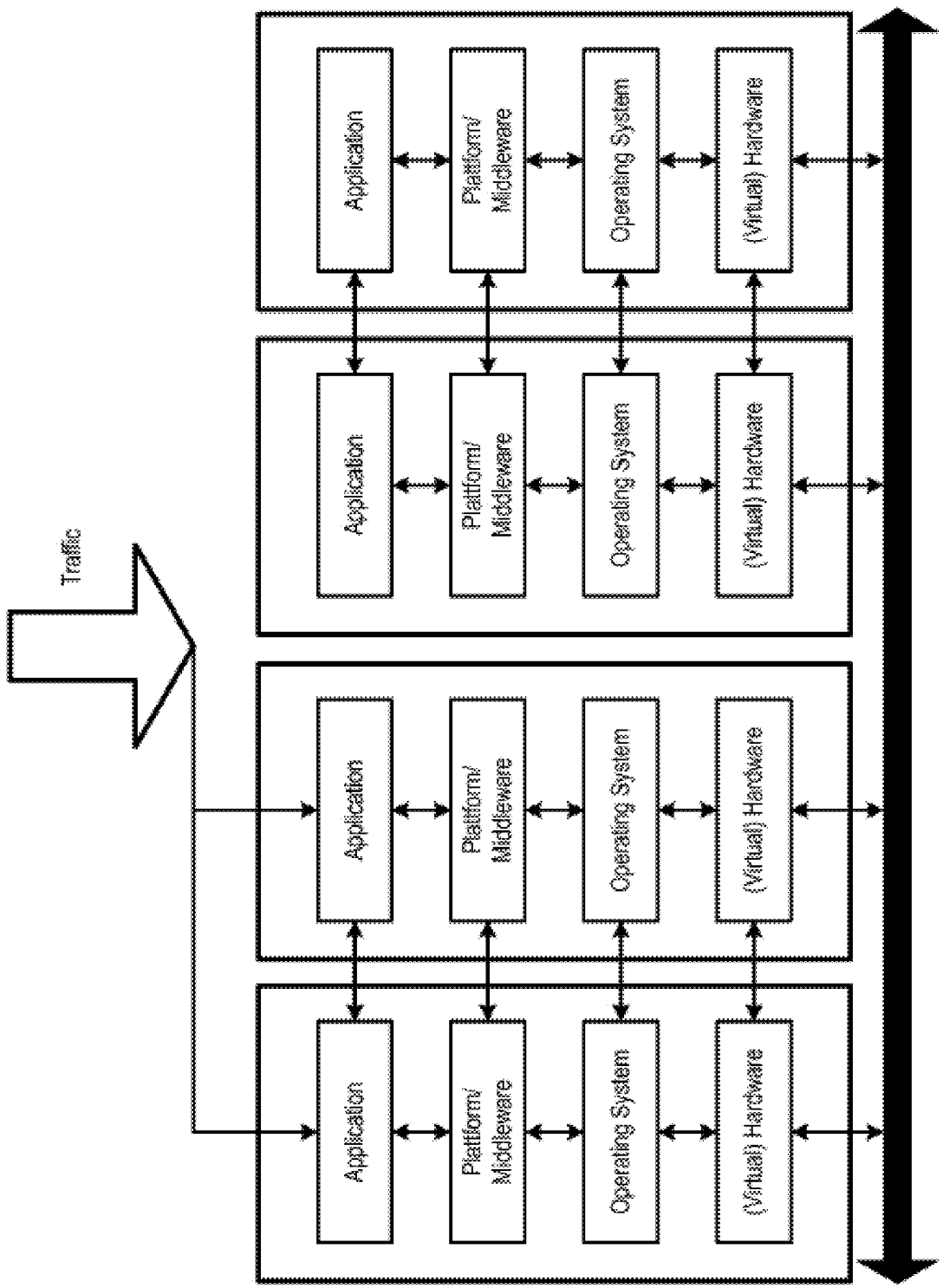
FIGS. 3A to 3E show an example how such a split mode upgrade can be used in the context of upgrading a mobile network function that follows a general instance structure with application, platform and operating system.
Figure 3B:
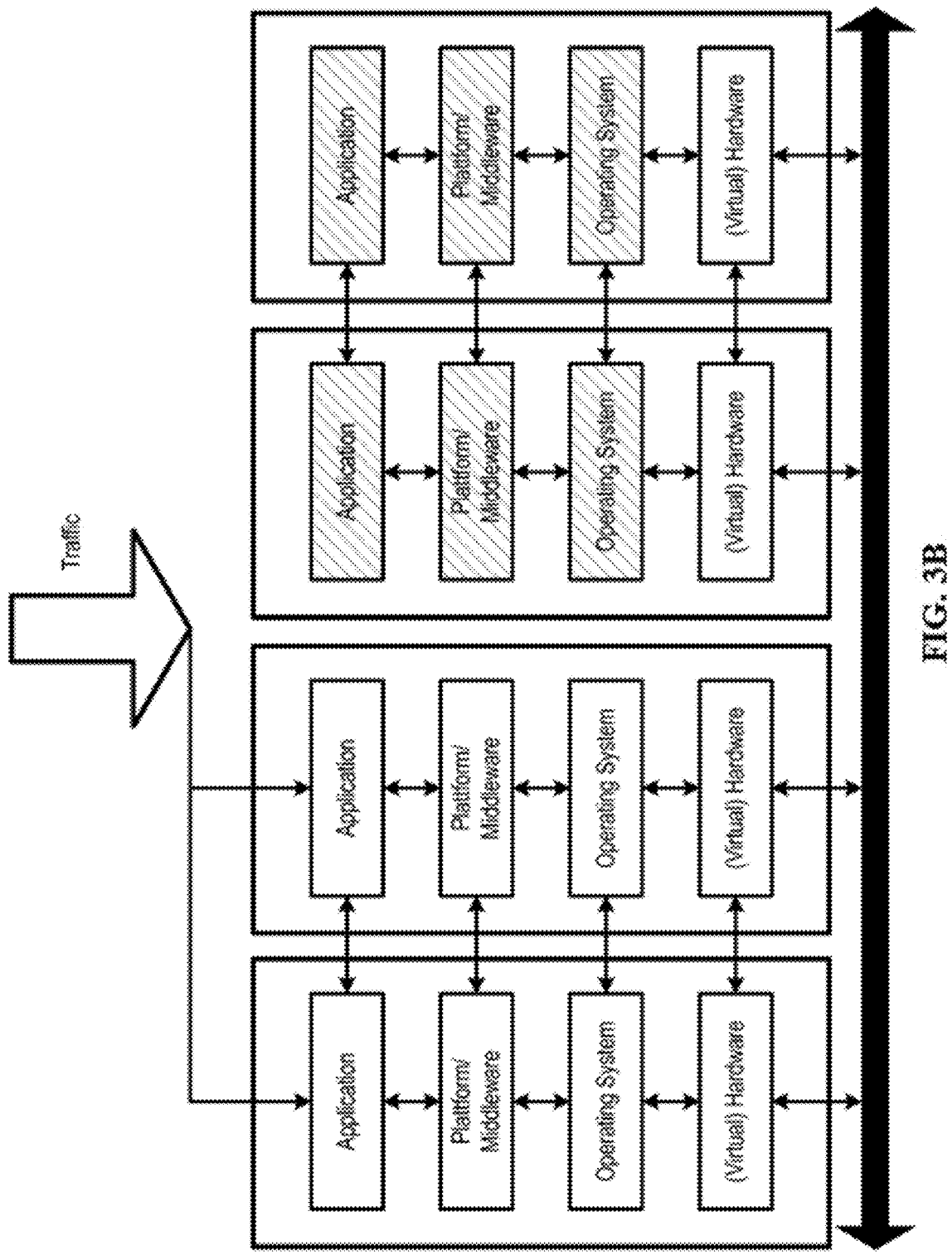
Figure 3C:
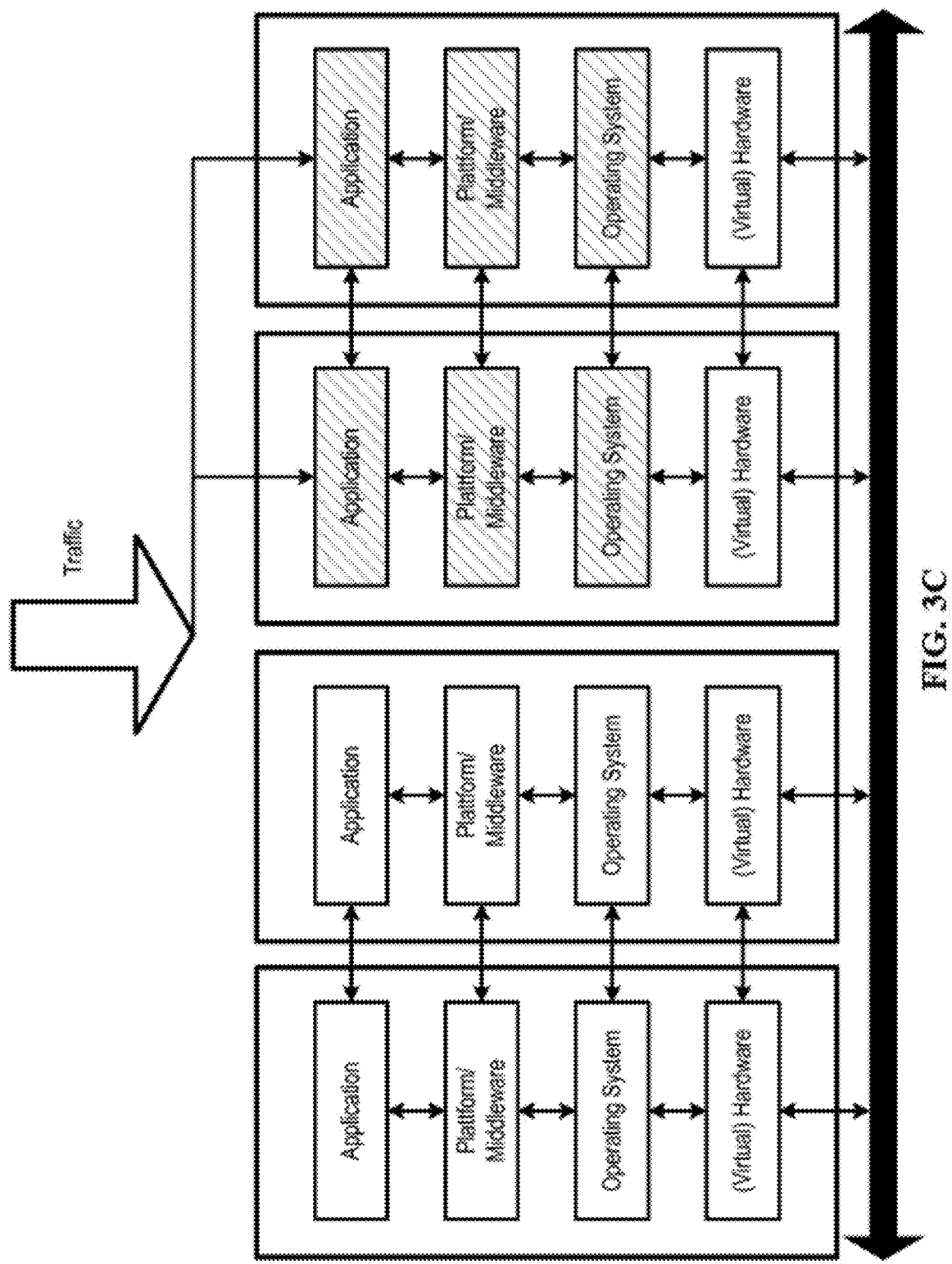
Figure 3D:
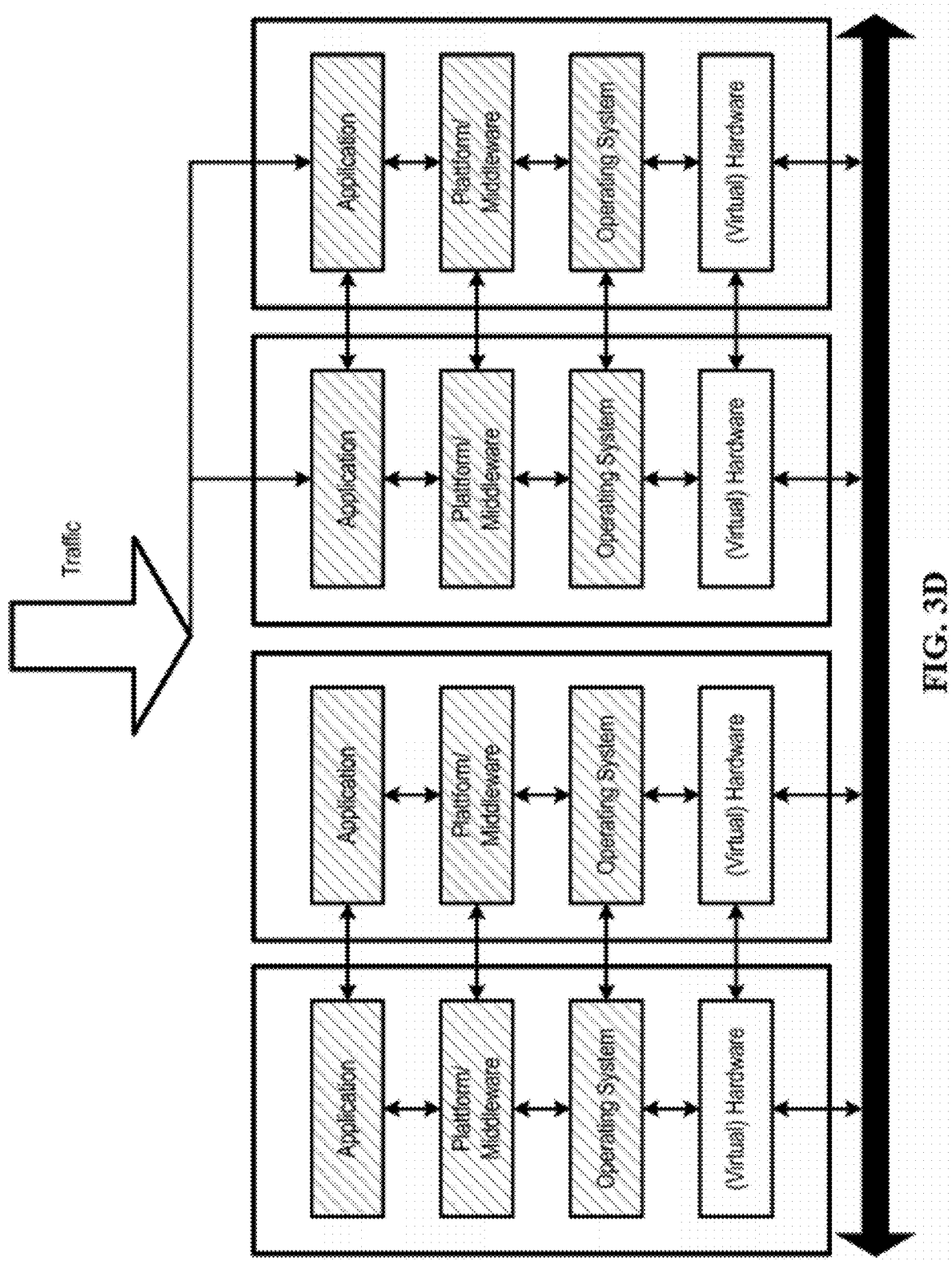
Figure 3E:
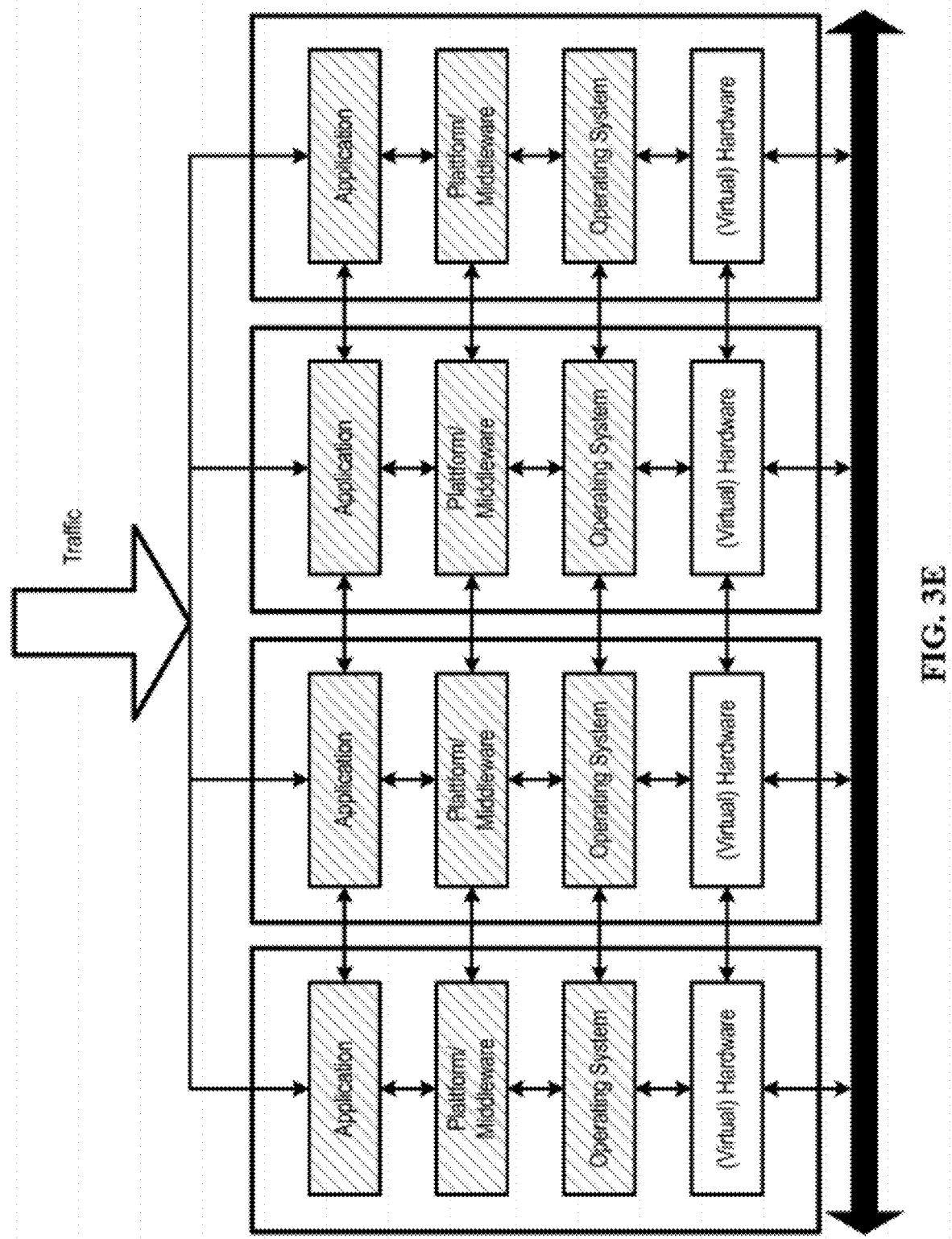

Distinguishing between already established and new services/traffic can be more demanding. Old and new services/traffic may not be distinguished at the lower layer protocols (e.g. physical, data link or network layer), but typically only in the higher layers within the specific protocol handling module of a mobile network function. The distinction between new services and existing services is of importance when considering stateful protocols, as service disruption during an upgrade are particularly relevant with respect to stateful protocols. As an example, FIG. 1 presents the interfaces and protocols among EPC network entities providing mobile network functions in a mobile network. The stateful protocols shown in the EPC are for example GTP-control (GTP-C), Proxy Mobile IP version 6 (PMIP), SCTP/Diameter and SCTP/S1-AP.

Figure 5:
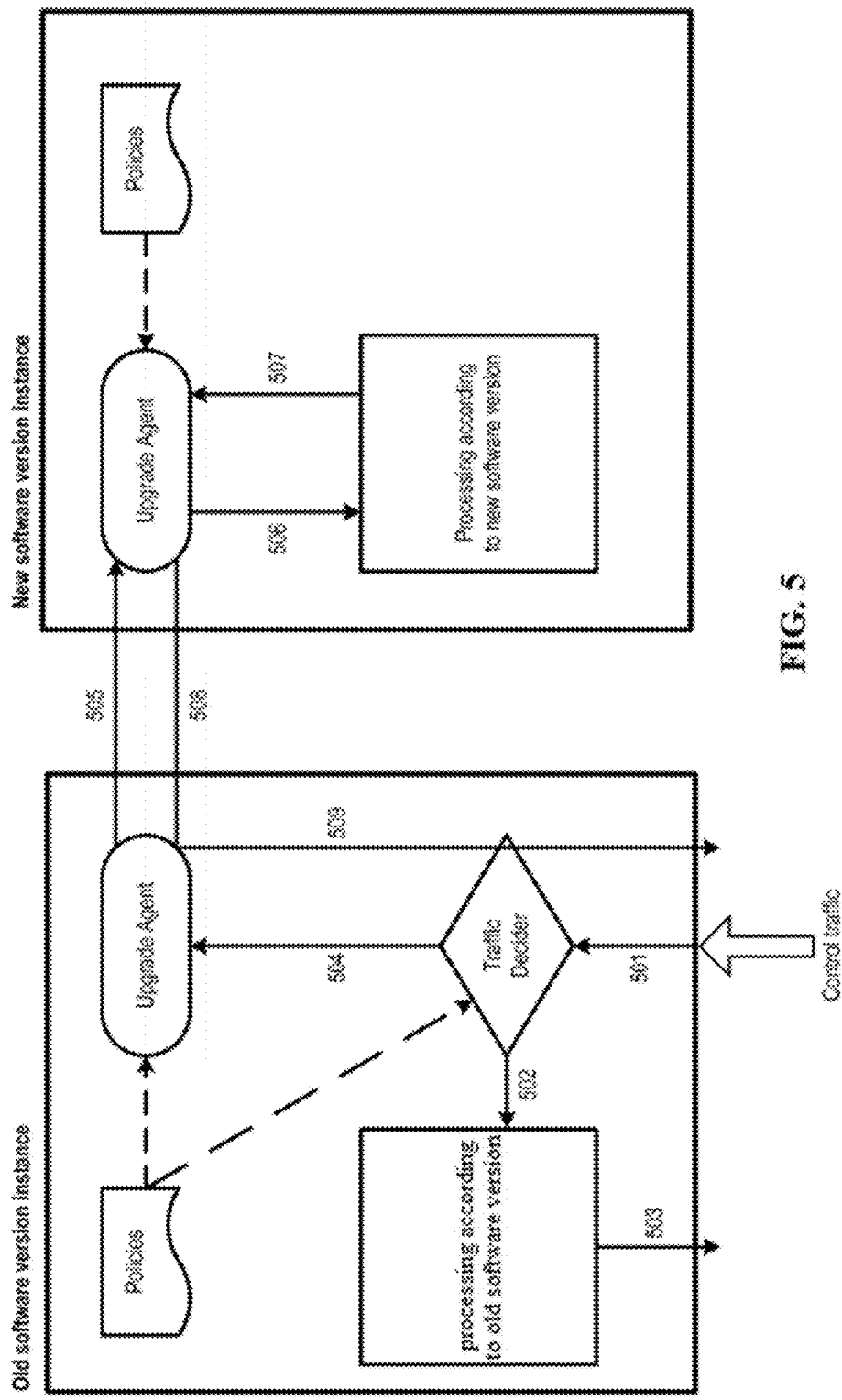
FIG. 5 shows an exemplary apparatus for implementing a method of in-service software upgrade according to one exemplary embodiment.

FIG. 5 shows an exemplary apparatus for implementing a method of in-service software upgrade according to one exemplary embodiment. The apparatus may be for example implemented in a network entity of a mobile communication system. The apparatus is made up of an instance implementing a mobile network function according to an old software version (designated as Old software version instance), and another instance implementing the same mobile network function according to a new software function (designated as New software version instance). On the old software version side, a traffic decider (also denoted traffic handling decision module herein), an upgrade agent and a set of rules (policy/policies) associated with a specific protocol are implemented in the instance implementing the mobile network function. On the new software version side, the instance is implemented using the new software version of the mobile network function, an upgrade agent and a set of rules (policy/policies) associated with a specific protocol for the same mobile network function.

Before the upgrade, rules specific to the protocol such as how to detect the first packet, criteria for deciding what is old and what is new traffic must be defined in both the old and new software versions. Upgrade agents are installed and configured according to the protocol-specific rules on each version. The traffic decider is installed and configured on the old software version side. During the upgrade operation, control traffic enters 501 (exclusively) through the instance implemented by the old software version. Based on the protocol-specific rules, the traffic decider separates incoming traffic into either new or old traffic (i.e. already ongoing sessions started before the upgrade, and new sessions), and routes the corresponding control traffic either to the instance implemented with the new software version (see 504) or internally (see 502) within the instance implemented with the old software version.

In the old traffic path, the control traffic is sent to the local, old software version software for processing and the result of the processing exits 503 on the old software version side. As regards the new traffic path, the control traffic is sent 504 to the local upgrade agent first. The local upgrade agent forwards 505 the traffic to the upgrade agent on the new software version side. There, the upgrade agent on the new software version side sends 506 the traffic to the new software version software for processing and the result of the processing is returned 507 to the upgrade agent on the new software version side. The upgrade agent on the new software version side forwards 508 result to the upgrade agent on the old software version side. The result exits 509 on the old software version side.

In some embodiment, the upgrade operation is typically driven by the management entity of a mobile network. The overall upgrade procedure, from the view of a management entity, according to an exemplary embodiment is shown in the flow chart of FIG. 6. As a first step 601, a software system at the network entity to be upgraded is prepared before the upgrade operation can be performed. Details of this preparation step will be explained in connection with FIG. 7 below. It is verified, whether the upgrade preparation was successfully performed in a verification step 602. If there is an error during upgrade preparation, preparation failure handling step 603 is carried out and the upgrade operation is aborted.

After successful preparation, as noted in the previous examples, during the actual upgrade operation, the serving capacity of the old software version at the network entity may be decreased in step 604 while the serving capacity of the new software version is increased in step 605. A verification of the results delivered by the new software version is performed in step 606. If there is an error in this verification, upgrade failure handling is carried out in step 607 and the upgrade is aborted. If the upgrade results can be successfully verified at step 606, the steps 604, 605 and 606 are repeated until the verification step 608 determines that the new software version instance(s) are capable of handling the full traffic load. When those predefined condition of the upgrade has been met, all the remaining traffic is switched to the new software version instance(s) in step 609. A verification of the switch operation is performed in step 610. If there is an error, related switch failure handling is carried out in step 611 and the upgrade is aborted.

Before the upgrade can be committed, a cleanup operation is carried out in step 612. Details of this cleanup step will be explained in connection with FIG. 8 below. It is again verified whether the cleanup has been successful in step 613, and cleanup failure handling is performed if not in step 614. In case cleanup was successful, the upgrade is committed in step 615.

Figure 6:
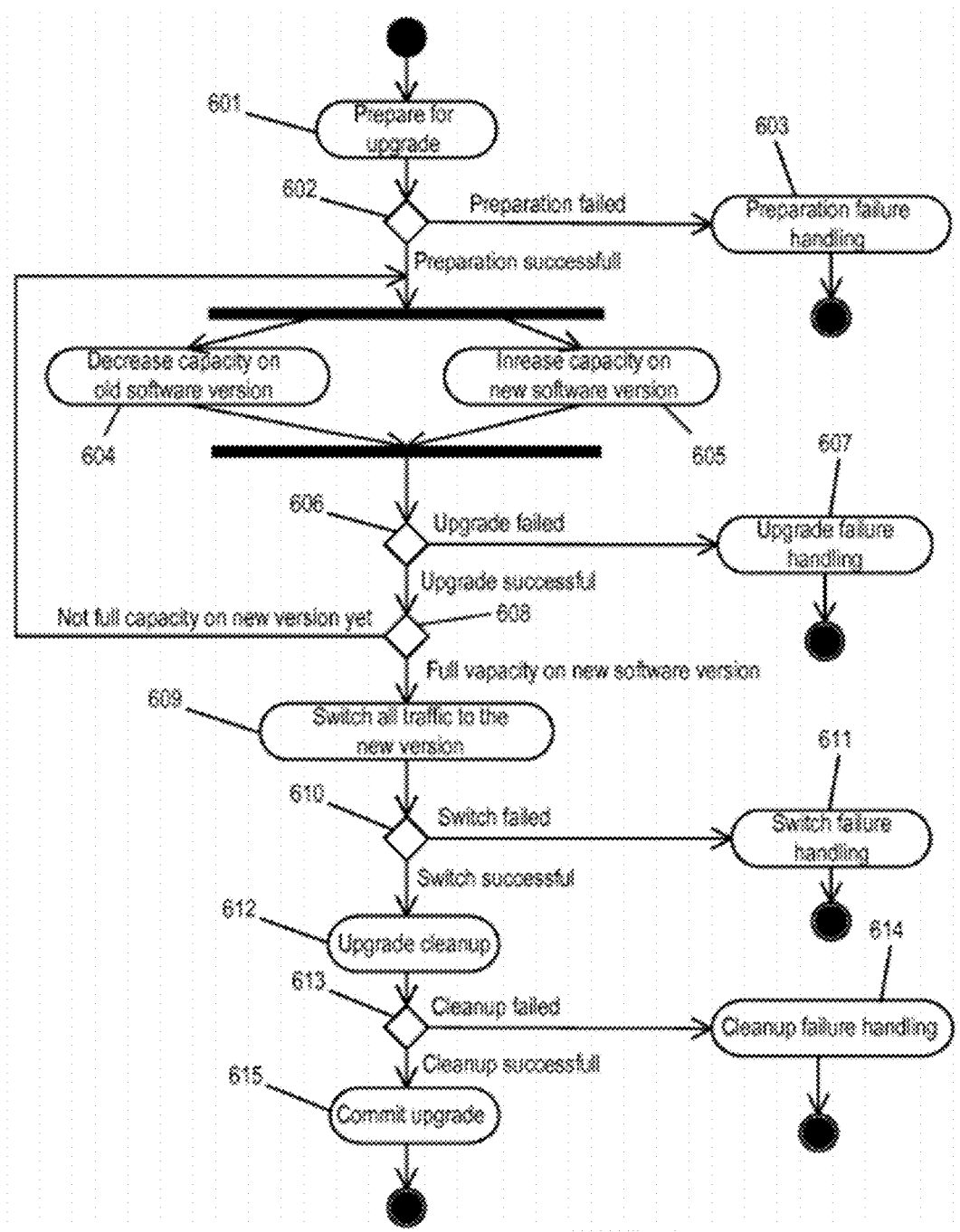
FIG. 6 shows a flow chart of an upgrade procedure according to an exemplary embodiment of the disclosure from the perspective of a management entity of the mobile communication network controlling the upgrade procedure.
Figure 7:
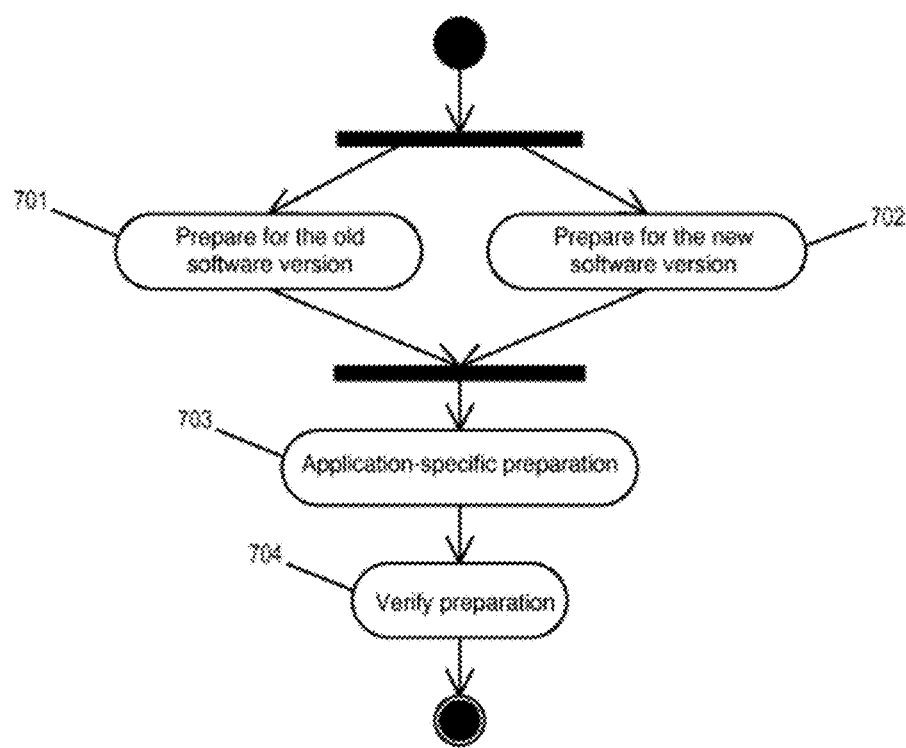
FIG. 7 shows an exemplary implementation of the preparation of upgrade step 601 of FIG. 6.

FIG. 7 shows an exemplary implementation of the prepare for upgrade procedure in step 601 of FIG. 6. The preparation steps 701 and 702 include configuring the upgrade agents at the old software version instance and the new software version instance as shown in FIG. 5. The application-specific preparation 703 involves obtaining and setting up the rules for detecting when a new connection request is made in the control traffic under the application-specific protocol for the given mobile network function in order to allow the traffic decider in the old software version instance of FIG. 5 discriminating connection requests from other control traffic and to route the new connection requests to the new software version instance (given that the policies are set accordingly). A verification of the preparation operation is also performed in step 704.

Figure 8:
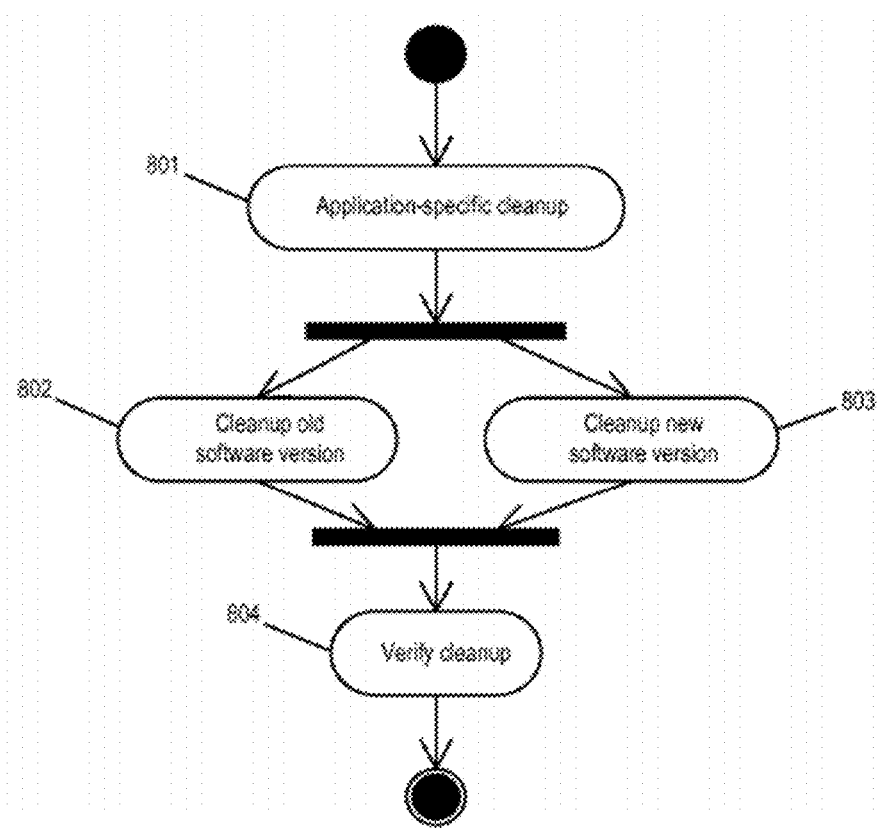
FIG. 8 shows an exemplary implementation of the upgrade cleanup procedure in step 612 of FIG. 6.

FIG. 8 shows an exemplary implementation of the upgrade cleanup procedure in step 612 of the FIG. 6. The exemplary cleanup operation includes an application-specific cleanup procedure in step 801. Furthermore, a cleanup of the removed old software version instance(s) in step 802 and a cleanup of the installation of the new software version instance(s) in step 803 are performed, followed by verification of the cleanup in step 804 as to whether the cleanup sub-processes have executed successfully.

For reasons of manageability and flexibility, the implementation of a mobile network typically follows the design principle of separation of policy and mechanism, which basically says what needs to be done in a policy while the mechanism specifies how it is done. This is prevalent especially in the management of a mobile network. In most of the previous examples, it has been assumed that the upgrade operation is complete when the new software version successfully takes over and serves the entire capacity of the traffic.

However, there are many other scenarios that can be defined by the policies, which allow switching to the new software version in steps 608 and 609 of FIG. 6. For example, step 608 could also verify whether X % of the users are being served by the new software version, and proceed with the switch in step 609 if this is the case. Another alternative may be to check in step 608 whether Y % of the user traffic capacity are being served by the old software version, and proceed with the switch in step 609 is this is the case. In yet another example, step 608 could check, whether a predetermined group of users have been migrated to the new software version, and switch in step 609 to the new software version if this is the case. As noted above, the policies may be defined so as to control the migration process and to decide when to switch in step 609 to the new software version.

An apparatus as exemplified in FIG. 6, may carry out the corresponding upgrade mechanism. Further, the traffic decider as part of its function provides a supporting mechanism. In another embodiment of the disclosure, the traffic decider can be operated in different modes, for example, in one of the two modes, enabled or disabled. The mode of operation of the traffic decider may influence the traffic decider's behavior when a new service request is found in the control traffic, which is based on the application-specific protocol for the relevant mobile network function, i.e. whether the new service requests are routed to a new software version instance or an old software version instance.

During normal operation, when there is no upgrade operation ongoing, the traffic decider may be in disabled mode. This means that all incoming (control) traffic may bypass the traffic decider and is served by the current software version. Alternatively, the disabled mode could also be considered a mode in which the traffic decider still received the incoming (control) traffic, but without taking any routing decision so that the traffic is handled exclusively by the current ("old") software version instance(s).

During an upgrade operation, the traffic decider may be operated in enabled mode. In enabled mode, as explained in connection with FIG. 5, the traffic decider directs previously established connections to the corresponding versions, that is, old traffic to the old software version and new traffic to the new software version, or forwards new connection creation request to the new software version via the upgrade agents.

During an upgrade operation, when the traffic decider is operated in disabled mode, the traffic decider directs previously established connections to the corresponding versions, that is, old traffic to the old software version and new traffic to the new software version, or directs new connection creation request to the local old software version.

Depending on the specific upgrade policy being enforced at the time, the supporting mechanism in the traffic decider can be used to carry out the necessary actions required. As an illustration, in one embodiment where the upgrade policy is to move all newly requested connection creations traffic to the new software version. This policy is then translated by the management entity responsible for upgrade into the action of enabling the traffic decider during the upgrade operation until the end of the upgrade operation.

In another embodiment, the upgrade policy might determine that a certain percentage of connections, for example, 10% of the connections, are to be moved to the new software version instance(s). This policy is then translated by the management entity responsible for upgrade into the action of enabling the traffic decider to create new connections on the new software version instance(s). When the desired level of 10% has been reached, the management entity responsible for upgrade disables the traffic decider in order not to raise the level above what is required. During this period of upgrade, established connections, whether it is along the old or new traffic paths, are directed by the traffic decider in disabled mode to the correct version for processing.

It must be noted that the above two embodiments are for illustration purposes. The disclosure can be used in many more embodiments whereby the upgrade policies can be translated into the action sequences of enabling and disabling the traffic decider during an upgrade operation.

In summary, the above exemplary upgrade procedures are useful for achieving the following advantages.

Since the full intended capacity can be served by a combination of the old and new software version instances of the mobile network function, this means that upgrade can be carried out at any time, even during the day and not restricted by the current practice of performing the upgrade only at off-peak times such as at night.

Due to incrementally increasing and decreasing of resource usage on the new and old software versions, minimal amount of additional resources are needed for the upgrade operation.

The fact that both the old and new software versions are running at the same time during an upgrade, data generated by the respective versions are handled by the correct version accordingly. This significantly reduces the problem of incompatibility between versions. For example, real-time data synchronization between old and new software versions is therefore not needed.

If the newly upgraded version does not work as intended, the mobile network function can be rolled back to the old software version as a failure recovery action. This failure recovery action can be performed very quickly because the old software version is still running. As soon as the full intended capacity of the traffic is restored on the old software version, the new software version can be disconnected and the failure recovery action is complete.

With the established traffic of connection-oriented services routed to the old traffic path for processing by the old software version, no service disruption can be guaranteed.

Testing of the new software version can be done with real traffic with the confidence that if it does not work properly, the failure recovery action of rolling back to the old software version can be performed very quickly because of the old and new software version coexistence property.

It should be further noted that the individual features of the different embodiments of the aspects discussed herein may individually or in arbitrary combination be subject matter to another disclosure.

Although some aspects have been described in the context of a method, it is clear that these aspects also represent a description of the corresponding apparatus suitably configured to perform such method. In such apparatus a (functional or tangible) block or device may correspond to one or more method step or a feature of a method step. Analogously, aspects described in the context of a corresponding block or item or feature of a corresponding apparatus may also correspond to individual method steps of a corresponding method.

Furthermore, the methods described herein may also be executed by (or using) a hardware apparatus, like a processor, microprocessor, a programmable computer or an electronic circuit. Some one or more of the most important method steps may be executed by such an apparatus. Where an apparatus has been described herein in terms of functional elements, e.g. processing unit, receiving unit, transmitter unit, or the like, it should be further understood that those elements of the apparatus may be fully or partly implemented in hardware elements/circuitry. Individual hardware, like a processor or microprocessor, a transmitter circuitry, receiver circuitry, etc., may be used to implement the functionality of one or more elements of the apparatus.

In addition, where information or data is to be stored in the process of implementing a method step of functional element of an apparatus in hardware, the apparatus may comprise memory or storage medium, which may be communicatively coupled to one or more hardware elements/circuitry of the apparatus.

It is also contemplated implementing the aspects of the disclosure in hardware or in software or a combination thereof. This may be using a digital storage medium, for example a floppy disk, a digital versatile disc (DVD), a BLU-RAY DISC, a compact disc (CD), a read-only memory (ROM), a programmable ROM (PROM), an erasable PROM (EPROM), an electrically EPROM (EEPROM) or a FLASH memory, having electronically readable control signals or instructions stored thereon, which cooperate (or are capable of cooperating) with a programmable computer system such that the respective method is performed. A data carrier may be provided which has electronically readable control signals or instructions, which are capable of cooperating with a programmable computer system, such that the method described herein is performed.

It is also contemplated implementing the aspects of the disclosure in the form of a computer program product with a program code, the program code being operative for performing the method when the computer program product runs on a computer. The program code may be stored on a machine readable carrier.

The above described is merely illustrative, and it is understood that modifications and variations of the arrangements and the details described herein will be apparent to others skilled in the art. It is the intent, therefore, to be limited only by the scope of the impending claims and not by the specific details presented by way of description and explanation above.

What is claimed is:

1. A traffic handling decision apparatus for use in a network entity of a mobile communication system, wherein the traffic handling decision apparatus comprises:
   a receiver configured to receive control plane traffic, wherein the control plane traffic comprises requests to a mobile network function, and wherein the traffic handling decision apparatus is provided within an instance implementing the mobile network function according to a current software version; and
   a processor coupled to the receiver and configured to:
      create at least one first instance implementing the mobile network function according to an upgraded software version;
      provide at least one second instance implementing the mobile network function according to the current software version, wherein the first instance and the second instance each comprise an application implementing the mobile network function, platform software for a service, and an operating system running on the traffic handling decision apparatus;
      decide, based on one or more policies, whether each of the requests to the mobile network function is to be processed by at least one of the second instances or by at least one of the first instances, and wherein the one or more policies define a set of rules and comprise:
         a first policy according to which requests of the control plane traffic related to a new bearer or session are to be routed to at least one of the first instances; and
         a second policy according to which requests of the control plane traffic related to an established bearer or session are to be routed to at least one of the second instances;

route one or more of the requests to either at least one of the first instances or at least one of the second instances based on a decision whether each of the requests is to be processed by at least one of the second instances or by at least one of the first instances;

add at least one additional first instance to increase a serving capacity of the upgraded software version; and decrease at least one of the second instances to reduce a serving capacity of the current software version.

2. The traffic handling decision apparatus of claim 1, wherein the first policy further comprises routing the requests of the control plane traffic related to the new bearer or session to:

at least one of the first instances implementing the mobile network function according to the upgraded software version when a predetermined percentage or number of established bearers or sessions is not yet routed to one or more instances implemented by the upgraded software version implementing the mobile network function; and at least one of the second instances implementing the mobile network function according to the current software version when the predetermined percentage or the number of established bearers or sessions is routed to the one or more instances.

3. The traffic handling decision apparatus of claim 1, wherein the mobile network function comprises:

a control plane function implemented by the network entity of the mobile communication system;

a user plane function implemented by the network entity of the mobile communication system; or a management function implemented by the network entity of the mobile communication system.

4. The traffic handling decision apparatus of claim 1, wherein the mobile network function comprises functionality implemented by the network entity in the mobile communication system.

5. The traffic handling decision apparatus of claim 1, wherein the traffic handling decision apparatus is implemented in a software of a stateful protocol of a network layer.

6. The traffic handling decision apparatus of claim 1, wherein the traffic handling decision apparatus is implemented in a higher layer within an Open Systems Interconnection (OSI) protocol stack.

7. A method for upgrading a current software version implementing a mobile network function without disrupting on-going bearers or sessions, comprising:

providing the mobile network function at a network entity by executing one or more instances implementing the mobile network function according to the current software version;

adding at least one instance implementing the mobile network function at the network entity according to an upgraded software version;

receiving, at the one or more instances implementing the mobile network function according to the current software version, control plane traffic comprising requests to the mobile network function;

routing one or more of the requests within the control plane traffic from at least one second instance of the one or more instances of the current software version to at least one first instance of the at least one instance implementing the mobile network function according to the upgraded software version according to one or more policies, and wherein the one or more policies define a set of rules and comprise:

a first policy according to which requests of the control plane traffic related to a new bearer or session are to be routed to at least one of the first instances; and a second policy according to which requests of the control plane traffic related to an established bearer or session are to be routed to at least one of the second instances;

processing, at each of the instances implementing the mobile network function according to the upgraded software version and at each of the instances implementing the mobile network function according to the current software version, the requests received at the respective instances;

adding at least one additional first instance to increase a serving capacity of the upgraded software version; and decreasing at least one of the second instances to reduce a serving capacity of the current software version.

8. The method of claim 7, further comprising deciding, based on activation of the one or more policies, whether to route one or more of the requests either to at least one of the first instances or to at least one of the second instances.

9. The method of claim 8, wherein the first policy further comprises routing the requests of the control plane traffic related to the new bearer or session to:

at least one of the first instances implementing the mobile network function according to the upgraded software version when a predetermined percentage of established bearers or sessions is not yet routed to one or more instances implementing the mobile network function according to the upgraded software version; and at least one of the second instances implementing the mobile network function according to the current software version when the predetermined percentage of established bearers or sessions is routed to the one or more instances.

10. The method of claim 8, wherein the first policy further comprises routing the requests of the control plane traffic related to the new bearer or session to:

at least one of the first instances implementing the mobile network function according to the upgraded software version when a number of established bearers or sessions is not yet routed to one or more instances implementing the mobile network function according to the upgraded software version; and at least one of the second instances implementing the mobile network function according to the current software version when the number of established bearers or sessions is routed to the one or more instances.

11. The method of claim 7, further comprising:

establishing, by at least one of the second instances implementing the mobile network function according to the current software version, an existing bearer for a second session in response to processing a second request within at least one of the second instances implementing the mobile network function according to the current software version;

receiving, via the existing bearer, user plane traffic of the second session at the at least one of the second instances implementing the mobile network function according to the current software version;

establishing, by at least one of the first instances implementing the mobile network function according to the upgraded software version, the new bearer for a first session in response to the processing of the requests of the control plane traffic related to the new bearer or session within at least one of the first instances implementing the mobile network function according to the upgraded software version; and receiving, via the new bearer, user plane traffic of the first session at the at least one of first instances implementing the mobile network function according to the upgraded software version.

12. The method of claim 7, further comprising removing the one or more instances implementing the mobile network function according to the current software version.

13. The method of claim 12, wherein an instance is removed either in response to a deletion or time-out of context information maintained by the mobile network function implemented according to the current software version, or in response to moving the context information maintained with the instance to another instance implementing the mobile network function according to the current software version, and wherein the method further comprises:

adding one or more second instances implementing the mobile network function at the network entity according to an upgraded software version; and in response to removing a last instance implementing the mobile network function according to the current software version, receiving the control plane traffic at the one or more second instances, and processing all requests received within the one or more second instances.

14. A network entity capable of upgrading a current software version implementing a mobile network function without disrupting on-going bearers or sessions, comprising:

a processor configured to:
execute at least one first instance implementing the mobile network function according to the current software version; and
execute at least one second instance implementing the mobile network function at the network entity according to an upgraded software version; and a transceiver coupled to the processor and configured to receive, at the at least one of the first instances implementing the mobile network function according to the current software version, control plane traffic comprising requests to the mobile network function, wherein the processor is further configured to:

route one or more of the requests within the control plane traffic from at least one of the second instances to the at least one of the first instances according to one or more policies, and wherein the one or more policies define a set of rules and comprise:

a first policy according to which requests of the control plane traffic related to a new bearer or session that is to be established after activation of the first policy are to be routed to at least one of the first instances; and a second policy according to which requests of the control plane traffic related to an established bearer or session established prior to activation of the second policy are to be routed to at least one of the second instances;

process, at each of the instances implementing the upgraded software version and at each of the instances implementing the current software version, the requests received at the respective instances;

add at least one additional first instance to increase a serving capacity of the upgraded software version; and decrease at least one of the second instances to reduce a serving capacity of the current software version.

15. The traffic handling decision apparatus of claim 1, wherein the first policy comprises routing the requests of the control plane traffic related to the new bearer or session to at least one of the first instances based on the new bearer or session that is to be established after activation of the first policy and based on a percentage of connections to at least one of the first instances.

16. The method of claim 7, wherein the first policy comprises routing the requests of the control plane traffic related to the new bearer or session to at least one of the first instances implementing the mobile network function using the upgraded software version based on the new bearer or session that is to be established after activation of the first policy and based on a percentage of connections to the second instance.

17. The network entity of claim 14, wherein the first policy comprises routing the requests of the control plane traffic related to the new bearer or session to at least one of the first instances implementing the mobile network function using the upgraded software version based on the new bearer or session that is to be established after activation of the first policy and based on a percentage of connections to the first instance.

18. The network entity of claim 14, wherein the mobile network function comprises:
a control plane function implemented by the network entity of a mobile communication system;
a user plane function implemented by the network entity of the mobile communication system; or
a management function implemented by the network entity of the mobile communication system.

19. The network entity of claim 14, wherein the mobile network function comprises functionality implemented by the network entity in a mobile communication system.

20. The network entity of claim 14, wherein the processor is further configured to implement routing the one or more requests in a higher layer within an Open Systems Interconnection (OSI) protocol stack.

* * * * *

UNITED STATES PATENT AND TRADEMARK OFFICE
CERTIFICATE OF CORRECTION

PATENT NO. : 11,115,274 B2
APPLICATION NO. : 15/680801
DATED : September 7, 2021
INVENTOR(S) : Shaoji Ni and Francis Pak Kwan Tam Page 1 of 1

It is certified that error appears in the above-identified patent and that said Letters Patent is hereby corrected as shown below:

In the Claims

Claim 14, Column 21, Lines 51 and 52: "session that is to be established after activation of the first policy are to be" should read "session are to be"

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*